United States Patent
Hopkins

(10) Patent No.: US 9,178,940 B2
(45) Date of Patent: Nov. 3, 2015

(54) SYSTEM AND METHOD FOR DETECTING PEER-TO-PEER NETWORK SOFTWARE

(75) Inventor: Samuel P. Hopkins, Freedom, PA (US)

(73) Assignee: Tiversa IP, Inc., Pittsburgh, PA (US)

( * ) Notice: Subject to any disclaimer, the term of this patent is extended or adjusted under 35 U.S.C. 154(b) by 1901 days.

(21) Appl. No.: 11/103,818

(22) Filed: Apr. 12, 2005

(65) Prior Publication Data

US 2006/0248525 A1  Nov. 2, 2006

(51) Int. Cl.
| | | |
|---|---|---|
| G06F 9/45 | (2006.01) |
| H04L 29/08 | (2006.01) |
| G06F 21/57 | (2013.01) |
| H04L 29/06 | (2006.01) |
| G06F 21/55 | (2013.01) |

(52) U.S. Cl.
CPC ............ *H04L 67/104* (2013.01); *G06F 21/552* (2013.01); *G06F 21/577* (2013.01); *H04L 63/10* (2013.01); *H04L 67/1068* (2013.01); *G06F 21/55* (2013.01)

(58) Field of Classification Search
CPC .......................................... G06F 21/00–21/128
USPC ................ 709/223–226; 726/22–23; 717/174
See application file for complete search history.

(56) References Cited

U.S. PATENT DOCUMENTS

| | | | | |
|---|---|---|---|---|
| 6,044,471 A * | 3/2000 | Colvin | ............................. | 726/28 |
| 6,151,643 A * | 11/2000 | Cheng et al. | ...................... | 710/36 |
| 6,298,446 B1 * | 10/2001 | Schreiber et al. | ................. | 726/27 |
| 6,574,729 B1 * | 6/2003 | Fink et al. | ........................... | 713/1 |
| 6,668,289 B2 * | 12/2003 | Cheng et al. | ...................... | 710/36 |
| 6,792,545 B2 * | 9/2004 | McCreight et al. | .............. | 726/29 |
| 6,918,113 B2 * | 7/2005 | Patel et al. | ...................... | 717/178 |
| 6,983,326 B1 * | 1/2006 | Vigue et al. | .................... | 709/229 |
| 7,042,852 B2 * | 5/2006 | Hrastar | .......................... | 370/310 |
| 7,046,995 B2 * | 5/2006 | Rygaard | ........................ | 455/418 |
| 7,051,098 B2 * | 5/2006 | Masters et al. | ................. | 709/224 |
| 7,086,089 B2 * | 8/2006 | Hrastar et al. | ................... | 726/22 |
| 7,089,301 B1 * | 8/2006 | Labio et al. | .................... | 709/224 |
| 7,096,503 B1 * | 8/2006 | Magdych et al. | ............... | 726/25 |
| 7,213,047 B2 * | 5/2007 | Yeager et al. | .................. | 709/202 |
| 7,263,070 B1 * | 8/2007 | Delker et al. | .................. | 370/254 |
| 7,277,404 B2 | 10/2007 | Tanzella et al. | | |
| 7,281,268 B2 * | 10/2007 | Hollander et al. | .............. | 726/22 |

(Continued)

FOREIGN PATENT DOCUMENTS

| | | |
|---|---|---|
| JP | 2004-046419 | 2/2004 |
| JP | 2004-343186 | 12/2004 |

(Continued)

OTHER PUBLICATIONS

Spognardi, Angelo, Alessandro Lucarelli, and Roberto Di Pietro. "A methodology for P2P file-sharing traffic detection." Hot Topics in Peer-to-Peer Systems, 2005. HOT-P2P 2005. Second International Workshop on. IEEE, 2005.*

(Continued)

*Primary Examiner* — Matthew Brophy
(74) *Attorney, Agent, or Firm* — Cesari and McKenna, LLP

(57) ABSTRACT

The present invention provides a method for detecting whether or not a computer system is, has, or can participate in a Peer-to-Peer network. Scanning software is executed on a target system to be scanned or a remote system which will scan a target system. If Peer-to-Peer client software is detected the scanning software can notify the enforcing user, disable the Peer-to-Peer client software, or both.

20 Claims, 1 Drawing Sheet

(56) References Cited

U.S. PATENT DOCUMENTS

| | | | |
|---|---|---|---|
| 7,296,288 B1* | 11/2007 | Hill et al. | 726/2 |
| 7,318,092 B2* | 1/2008 | Sutler | 709/223 |
| 7,325,251 B1* | 1/2008 | Szor | 726/22 |
| 7,543,052 B1* | 6/2009 | Klein | 709/224 |
| 7,664,048 B1* | 2/2010 | Yung et al. | 370/253 |
| 7,840,663 B1 | 11/2010 | Hinchliffe et al. | |
| 7,903,822 B1 | 3/2011 | Hair et al. | |
| 8,667,103 B2* | 3/2014 | Adar et al. | 709/223 |
| 2001/0003191 A1 | 6/2001 | Kovacs et al. | |
| 2002/0044549 A1 | 4/2002 | Johansson et al. | |
| 2002/0069098 A1 | 6/2002 | Schmidt | |
| 2002/0073204 A1 | 6/2002 | Dutta et al. | |
| 2002/0087885 A1 | 7/2002 | Peled et al. | |
| 2002/0184310 A1 | 12/2002 | Traversat et al. | |
| 2003/0041141 A1 | 2/2003 | Abdelaziz et al. | |
| 2003/0055892 A1 | 3/2003 | Huitema et al. | |
| 2003/0093466 A1 | 5/2003 | Jarman et al. | |
| 2003/0095660 A1 | 5/2003 | Lee et al. | |
| 2003/0112974 A1 | 6/2003 | Levy | |
| 2003/0195852 A1 | 10/2003 | Campbell et al. | |
| 2003/0208621 A1 | 11/2003 | Bowman | |
| 2004/0003266 A1* | 1/2004 | Moshir et al. | 713/191 |
| 2004/0030651 A1 | 2/2004 | Kim et al. | |
| 2004/0039921 A1* | 2/2004 | Chuang | 713/187 |
| 2004/0044996 A1* | 3/2004 | Atallah | 717/169 |
| 2004/0107347 A1 | 6/2004 | Ogino | |
| 2004/0122958 A1 | 6/2004 | Wardrop | |
| 2004/0133640 A1 | 7/2004 | Yeager et al. | |
| 2004/0148434 A1 | 7/2004 | Matsubara et al. | |
| 2004/0153658 A1 | 8/2004 | Gunyakti et al. | |
| 2004/0162871 A1 | 8/2004 | Pabla et al. | |
| 2005/0044483 A1 | 2/2005 | Maze et al. | |
| 2005/0091397 A1* | 4/2005 | Roberts et al. | 709/232 |
| 2005/0105476 A1 | 5/2005 | Gotesdyner et al. | |
| 2005/0108557 A1 | 5/2005 | Kayo et al. | |
| 2005/0177752 A1* | 8/2005 | Hollander et al. | 713/201 |
| 2005/0193216 A1* | 9/2005 | Gurda et al. | 713/200 |
| 2005/0198535 A1* | 9/2005 | Basche et al. | 713/201 |
| 2006/0059560 A1 | 3/2006 | Montulli | |
| 2006/0103732 A1* | 5/2006 | Bateman | 348/208.2 |
| 2006/0168304 A1* | 7/2006 | Bauer et al. | 709/232 |
| 2006/0200865 A1* | 9/2006 | Leake et al. | 726/27 |
| 2006/0242121 A1 | 10/2006 | DeVorchik et al. | |
| 2006/0248062 A1 | 11/2006 | Libes et al. | |

FOREIGN PATENT DOCUMENTS

| | | |
|---|---|---|
| JP | 2006-311048 | 11/2006 |
| JP | 2006-330783 | 12/2006 |
| WO | WO 03/063023 A2 | 7/2003 |
| WO | WO 2004/047408 | 6/2004 |
| WO | WO 2004/086168 | 10/2004 |

OTHER PUBLICATIONS

Sen, Subhabrata, Oliver Spatscheck, and Dongmei Wang. "Accurate, scalable in-network identification of p2p traffic using application signatures." Proceedings of the 13th international conference on World Wide Web. ACM, 2004.*

Zupeng Li et al., "Research of Peer-to-Peer Network Architecture," Proceedings of ICCT2003, pp. 312-315.

Marmor, Michael S., "Make the P2P Lead with Toadnode," www.webtecniques.com, Dec. 2000, pp. 44-49.

Ueda, Kiyoshi et al., "Peer-to-Peer Network Topology Control within a Mobile Ad-hoc Network," 2003 IEEE, pp. 243-247.

Liu, Jiangchuan, et al., "Distributed Distance Measurement for Large-Scale Networks," Computer Networks 41 (2003) 177-192.

Siu Man Lui and Sai Ho Kowk, "Interoperability of Peer-To-Peer File Sharing," ACM SIGecom Exchanges, vol. 3, No. 3, Aug. 2002, pp. 25-33.

Brandon Wiley, Freenet, "Inoperability Through Gateways," Chapter 19, pp. 381-392.

Zhenyun Zhuang et al., "Hyrid Periodical Flooding in Unstructured Peer-to-Peer Networks," Proceedings of the 2003 International Conference on Parallel Proceeding.

Steven Hessing, "Peer to Peer Messaging Protocol," Internet-Draft, Apr. 2002, pp. 1-57.

Oram, A., "Peer-to-Peer: Harnessing the Power of Disruptive Technologies", Ch. 19 Interoperablity Through Gateways, Mar. 2001, p. 381-392.

Lindemann, C. et al., "A Distributed Search Service for Peer-to-Peer File Sharing in Mobile Applications", Peer-to-Peer Computing, 2002, Proceedings of the Second International Conference on Peer-to-Peer Computing, Sep. 5-7, 2002.

Findeli, M., "Peer-to-Peer (P2P) Networkgin", On Line, Jul. 1, 2001, p. 1-21.

Scarlata, V. et al., "Responder Anonymity and Anonymous Peer-to-Peer File Sharing", Proceedings of the International Conference on Network Protocols, Nov. 11, 2001, p. 272-280.

Xiao, L. et al., "Mutual Anonymity Protocols for Hybrid Peer-to-Peer Systems", Proceedings of the 23rd Intenrational Confernece on Distributed Computing Systems, May 19-22, 2003.

Supplementary Search Report mailed on Dec. 20, 2012 for European Patent Application No. 06 749 896.4 filed on Apr. 11, 2006 by Tiversa, Inc., 7 pages.

Richard, Matthew, "Intrusion Detection FAQ: Are there limitations of Intrusion Signatures?" Sans Institute, Apr. 5, 2001, https://www.sans.org/security-resources/idfaq/limitations.php., 5 pages.

Mennecke, Thomas, "P2P Users Face New Challenge—Update," Slyck News, Dec. 15, 2003, http://www.slyck.com/story345_P2P_Users_Face_New_Challenge_Update, 3 pages.

Notice of Reasons for Rejection, dated Jun. 24, 2013 for Japanese Patent Application No. 2011-239203, 5 pages.

Katsuo Yamada, "Latest P2P Mechanism and Corporate Defense Measures," "N + I NETWORK Guide," Japan, Softbank Publishing Corp., Nov. 1, 2004, 2004. 11, pp. 084-093—Partial English explanation available (See Notice of Reasons for Rejection, dated Jun. 24, 2013 for Japanese Patent Application No. 2011-239203, 5 pages.).

TTS, "Latest P2P Mechanism and Corporate Defense Measures," "N + I NETWORK Guide," Japan, Softbank Publishing Corp., Nov. 1, 2004, 2004. 11, pp. 071-078—Partial English explanation available (See Notice of Reasons for Rejection, dated Jun. 24, 2013 for Japanese Patent Application No. 2011-239203, 5 pages.).

TTS, "Latest P2P Mechanism and Corporate Defense Measures," "N + I NETWORK Guide," Japan, Softbank Publishing Corp., Nov. 1, 2004, 2004. 11, pp. 094-097—Partial English explanation available (See Notice of Reasons for Rejection, dated Jun. 24, 2013 for Japanese Patent Application No. 2011-239203, 5 pages.).

Youngfen Chen, et al. "Detecting randomly scanning worms based on heavy-tailed property", Networking, Sensing and Control, 2005, Proceedings 2005 IEEE Tucson, AZ Mar. 19-22, 2005, Piscataway, NJ, IEEE, Mar. 19, 2005, pp. 354-358.

Kotegawa et al., "Design for end host security management mechanism with mobile agents," a collection of papers of Computer Security Symposium 2004 (CSS2004) vol. II of II, Information Processing Society of Japan, Oct. 20, 2004, vol. 2004, No. 11, pp. 637-642—Partial English Translation available (See Office Action for Japanese Patent Application No. 2008-506642, mail date Feb. 15, 2010, 8 pages.).

Office Action for Japanese Patent Application No. 2008-506642, mail date Feb. 15, 2010, 8 pages.

Miyamoto, "Method of detecting/blocking unexpected communication," the Jun. 2004 issue of SoftwareDesign, Gijutsu-Hyohron CO., Ltd., Jun. 18, 2004, No. 230, pp. 33-36—Partial English Translation available (See Office Action for Japanese Patent Application No. 2008-506642, mail date Feb. 15, 2010, 8 pages.).

Oda et al., "Part 3 Putting home server to practical use on the Internet with dynamic DNS," the Apr. 2003 issue of PC Japan, Softbank Publishing Co., Ltd., Apr. 1, 2003, vol. 8, No. 4, pp. 147-155—Partial English Translation available (See Office Action for Japanese Patent Application No. 2008-506642, mail date Feb. 15, 2010, 8 pages.).

International Search Report and Written Opinion mailed on Sep. 26, 2007 for PCT/US06/44366 filed on Nov. 15, 2006 by Tiversa, Inc., 8 pages.

International Search Report and Written Opinion mailed on Sep. 24, 2007 for PCT/US06/13671 filed on Apr. 11, 2006 by Tiversa, Inc., 8 pages.

* cited by examiner

SYSTEM AND METHOD FOR DETECTING PEER-TO-PEER NETWORK SOFTWARE

FIELD OF THE INVENTION

The present invention provides a system for detecting whether or not a computer system is, has, or can participate in a Peer-to-Peer network.

BACKGROUND OF THE INVENTION

As used herein, peer to peer networks which are the subject of the present invention comprise multiple nodes, each node typically consisting both of file server and client which can send and receive data or "Communication messages" to or from a node to which such is connected.

In a peer to peer network each node is connected to other nodes over a communication medium such as the internet either directly or through some type of proxy. For example, when a search request is issued such originating node sends a search request to all of the nodes to which it is connected. (see FIG. 1) These nodes search their list of available files and if a match is found they send a response back with the location. However, a peer to peer proxy network typically consists of node A which is connected to a node B and node B is connected to a node C. (see FIG. 2) Node A is not connected to node C such that if node A issues a search request it will be forwarded to node B and Node B will search its available files and if a match is found it will send a response back to node A. Node B will then forward node A's request to node C and Node C will search its available files and if a match is found it will send a response back to node B. Node B will then forward this response to node A. FIG. 3 discloses a nonproxy loop network wherein each node is directly connected to another.

Some peer to peer networks utilize a leaf node/main node proxy topology (See FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node that it is connected to. The main node then forwards the request to any other leaf nodes that are connected to it and also to any main nodes it is connected to. These main nodes forward the request to any leaf nodes that are connected to them.

Commonly these networks are used to share music, movies, and software files among its users. To access this network a user installs a Peer-to-Peer client software application that is capable of connecting to, and utilizing the Peer-to-Peer network. When installing the software the user must select a folder on their computer system in which to store any downloaded files. Any files placed into this folder are also made available to other users. For instance, if user #1 places a file named "foofile" in their shared folder, user #2 would then be able to access and download the file.

For whatever reason, users sometimes select a folder that contains sensitive information or information they do not otherwise wish to share as the shared folder or they may later begin to place sensitive information or information they do not otherwise wish to share into their shared folder by mistake. Usually this action is done by mistake and unknowingly by the user but sometimes it is done by a malicious person. Sometimes the Peer-to-Peer client software has a software bug that permits the sharing of files and directories that the user never intended to be shared. Sometimes it is a violation of corporate policy to have Peer-to-Peer client software installed.

The information shared may be detrimental the user, the company they work for, or even to national security. It would therefore be advantageous to network administrators or others whose responsibility it is to enforce information containment to be able to locate computers with Peer-to-Peer network software installed so that it can be assessed or removed. It would also be advantageous to know if Peer-to-Peer network software has ever been installed and utilized so that a threat assessment can be made.

Accordingly it is an object of the present invention to provide a system for scanning a computer to ascertain whether or not it is, has, or can participate in a Peer-to-Peer network.

SUMMARY OF THE INVENTION

Generally, the present invention provides a system for ascertaining whether or not a computer is, has, or could participate in a Peer-to-Peer network. The preferred system comprises the steps of:
 a. Executing a software program on the target computer; and
 b. Scanning said target computer for signs of Peer-to-Peer client software, Peer-to-Peer network communications, or files obtained from Peer-to-Peer networks.

Thus, the present invention provides a system for scanning a computer system to ascertain whether or not the computer is, has, or could participate in a Peer-to-Peer network.

Other advantages of the present invention will become apparent from a perusal of the following detailed description of presently preferred embodiments of the invention.

DESCRIPTION OF PRESENTLY PREFERRED EMBODIMENTS

Figure 1:
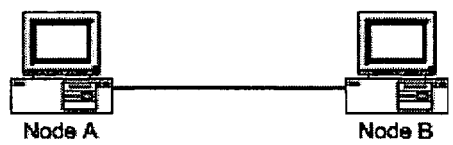
FIG. 1 is a simplified schematic of a two node peer to peer network.
Figure 2:
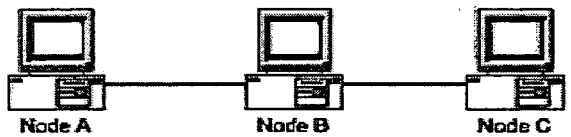
FIG. 2 is a simplified schematic of a peer to peer proxy network.
Figure 3:
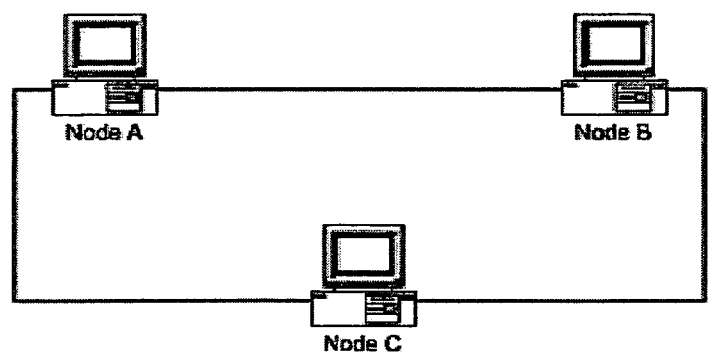
FIG. 3 is a simplified schematic view of a peer to peer, nonproxy, loop network.

The preferred system of the present invention advantageously utilizes a scanning software program to scan the target computer to look for signs of participation in a Peer-to-Peer network, an ability to participate in a Peer-to-Peer network, or both. The scanning software has certain preferred attributes and these attributes are configured for the specific type of Peer-to-Peer scanning system desired by the enforcing user.

In one preferred embodiment of the present invention, a software program is executed on the target computer. This software program will look through registry entries for a specific set of keys or values that match known Peer-to-Peer client software. If a match is found the enforcing user can be notified, the software program can disable the Peer-to-Peer client software, or both.

In another embodiment of the present invention, a software program is executed on the target computer. This software program will look through the files and directories for a specific set of values that match known Peer-to-Peer client software. If a match is found the enforcing user can be notified, the software program can disable the Peer-to-Peer client software, or both.

In another embodiment of the present invention, a software program is executed on the target computer. This software program will look through currently running processes for a value that matches known Peer-to-Peer client software. If a match is found the enforcing user can be notified, the software program can disable the Peer-to-Peer client software, or both.

In another embodiment of the present invention, a software program is executed on the target computer. This software program will look through the files and directories for files that are music, movie, ebooks, or other files commonly acquired from Peer-to-Peer networks. If the computer contains more than a specific number of these files the enforcing user can be notified.

In another embodiment of the present invention, a software program is executed on the target computer. This software program will monitor network communications looking for specific values that indicate a Peer-to-Peer network communication is occurring. If a communication is occurring the enforcing user can be notified, the software program can disable the Peer-to-Peer network communication, or both.

In another embodiment of the present invention, a software program is executed that scans the TCP/IP ports of a target computer looking for known Peer-to-Peer network ports. The enforcing user can be notified if a match is found.

In the preferred embodiment, the invention is embodied in a computer system that contains a processor unit, main memory, and an interconnect bus. The processor unit may contain a single microprocessor, or may contain a plurality of microprocessors for configuring the computer as a multi-processor system. The main memory stores, in part, instructions and data for execution by the processor unit. If the ability of the inventive system is wholly or partially implemented in software, the main memory stores the executable code when in operation. The main memory may include banks of dynamic random access memory as well as high speed memory.

The computer system may further include a mass storage device, peripheral devices, portable storage medium drives, input control device, a graphics subsystem, and an output display. The computer system may be connected through one or more data transport means. For example, the processor unit and the main memory may be connected via a local microprocessor bus, and the mass storage device, peripheral devices, portable storage medium drives, graphics subsystem may be connected via one or more input/output (I/O) busses. The mass storage device, which may be implemented with a magnetic disk drive or an optical disk drive, is nonvolatile storage device for storing data and instructions for use by the processor unit. In the software embodiment, the mass storage device stores the software for loading to the main memory.

The input control device(s) provide a portion of the user interface for a user of the computer system. The input control devices may include an alpha numeric keypad for inputting alphanumeric and other key information, a cursor control device, such as a mouse, a trackball, a stylus, or cursor direction keys. In order to display textual and graphical information, the computer system contains the graphics subsystem and the output display. The output display may include a cathode ray tube display or a liquid crystal display. The graphics subsystem receives textual and graphical information and processes the information for output to the output display.

The components contained in the computer system are those typically found in general purpose computer systems, and in fact, these components are intended to represent a broad category of such computer components that are well known in the art.

The system may be implemented in either hardware or software. For the software embodiment, the software that includes a plurality of computer executable instructions for implementation on a general purpose computer system. Prior to loading into a general purpose computer system, the system may reside as encoded information on a computer readable medium, such as a magnetic floppy disc, magnetic tape compact disc read only memory (CD-ROM). In one hardware embodiment, the system may comprise a dedicated processor including processor instructions for performing the functions described herein. Circuits may also be developed to perform the functions described herein.

EXAMPLES

The following Examples illustrate various embodiments of the systems according to the present Invention.

Example 1

This example illustrates a system for detecting Peer-to-Peer client software by reviewing a target computer system's registry keys and their values.

In this example a user has installed Peer-to-Peer client software onto computer system #1. The Peer-to-Peer client software as part of its installation and operation has created a registry key with a value of "P2PCLIENT_DOWNLOAD_DIR." The scanning software is then executed on computer system #1. The scanning software reviews computer system #1's registry keys looking for a match for a known key, "P2PCLIENT_DOWNLOAD_DIR." A match is found and the network administrator is notified. The scanning software then removes the registry key to disable the Peer-to-Peer client software.

Example 2

This example illustrates a system for detecting Peer-to-Peer client software by reviewing the files and directories of a target computer system.

In this example a user has installed Peer-to-Peer client software onto computer system #1. The Peer-to-Peer client software as part of its installation has created a directory with a value of "P2P_SOFTWARE." The scanning software is then executed on computer system #1. The scanning software reviews computer system #1's files and directories looking for a match for a known directory "P2P_SOFTWARE." A match is found and the network administrator is notified.

Example 3

This example illustrates a system for detecting Peer-to-Peer client software by reviewing the files and directories of a target computer system whose directories have been shared on a private network and made available to another remote system.

In this example a user has installed Peer-to-Peer client software onto computer system #1. The Peer-to-Peer client software as part of its installation has created a directory with a value of "P2P_SOFTWARE." The scanning software is then executed on a remote computer system #2. The scanning software reviews computer system #1's files and directories over the private network looking for a match for a known directory "P2P_SOFTWARE." A match is found and the network administrator is notified.

Example 4

This example illustrates a system for detecting Peer-to-Peer client software by reviewing the processes that are currently running on a target computer system.

In this example a user has installed Peer-to-Peer client software onto computer system #1. While in operation, the Peer-to-Peer client software has registered with the computer with a process name of "p2 psoftware.exe" The scanning software is then executed on computer system #1. The scanning software reviews computer system #1's processes looking for a match for a known process "p2 psoftware.exe." A match is found and the network administrator is notified.

Example 5

This example illustrates a system for detecting Peer-to-Peer client software by reviewing the number of music files that exist on a target computer system.

In this example a user has installed Peer-to-Peer client software onto computer system #1 and has downloaded 15 music files. The scanning software is then executed on computer system #1. The scanning software counts the number of music files located on the computer and compares that number to a set threshold of 10. The number of music files located is over the set threshold and the network administrator is notified.

Example 6

This example illustrates a system for detecting Peer-to-Peer client software by looking at network communications occurring on a target computer system.

In this example a user has installed Peer-to-Peer client software onto computer system #1 and is connected to a Peer-to-Peer network. Peer-to-Peer protocol messages between computer system #1 and the Peer-to-Peer network always start with "123456." The scanning software is then executed on computer system #1. The scanning software monitors all network communications for a known pattern of "123456." A match is found and the network administrator is notified.

Example 7

This example illustrates a system for detecting Peer-to-Peer client software by looking at what TCP/IP ports are available on a target computer system.

In this example a user has installed Peer-to-Peer client software onto computer system #1. The Peer-to-Peer client software is currently running and has bound to port 6346 to accept inbound connections from other Peer-to-Peer clients. The scanning software is then executed either on computer system #1 or a remote computer. The scanning software attempts to connect to the known port "6346" on the target computer. A connection is successful and the network administrator is notified.

What is claimed is:

1. A system for detecting peer-to-peer network software, said system comprising:
   a. a storage medium for storing instructions;
   b. a user input device for receiving user input; and
   c. a processor unit operable to process said user input and to use said instructions to execute a scanning program to:

i. review a first feature of a target computer indicative of installation of peer-to-peer client software on the target computer, wherein said first feature is selected from a group consisting of said target computer's registry keys, registry values, installed executable files, disk directories and network communications;
      ii. compare said first feature of said target computer to first known information indicative of installation of the peer-to-peer client software on the target computer;
      iii. review a second feature of said target computer indicative of past participation in peer-to-peer network communication by the peer-to-peer client software on said target computer, said second feature consisting of determining if multimedia files are stored locally on said target computer;
      iv. compare said second feature of said target computer to second known information including at least a predetermined threshold count of multimedia files wherein a search is initiated on an entirety of local storage of said target computer for the multimedia files and the search is stopped when the predetermined threshold count of multimedia files is reached, the predetermined threshold count of multimedia files being indicative of the past participation by the peer-to-peer client software in the peer-to-peer network communication;
      v. determine that the peer-to-peer client software has been installed on said target computer and that files are being shared by the target computer in the peer-to-peer network communication in response to the compare of said first feature matching the first known information indicative of installation of the peer-to-peer client software on the target computer and the compare of said second feature being greater than or equal to the second known information including at least the predetermined threshold count of multimedia files;
      vi. in response to the determination that the peer-to-peer client software has been installed on said target computer and that files are being shared by the target computer in the peer-to-peer network communication, disable the peer-to-peer client software and notify a network administrator of result of the comparisons; and
      vii. determine that the peer-to-peer client software has not been installed on said target computer and that files are not being shared by the target computer in the peer-to-peer network communication in response to the compare of said first feature not matching the first known information indicative of installation of the peer-to-peer client software on the target computer and the compare of said second feature being less than the second known information including the at least the predetermined threshold count of multimedia files.

2. The system as set forth in claim 1 wherein said first feature further comprises executing the scanning program to:
   i. connect to a TCP/IP port of the target computer TCP/IP port;
   ii. establish a successful connection with said target computer;
and said compare of said first feature further comprises executing the scanning program to:
   iii. compare a TCP/IP port number to a known value; and iv. determine that the peer-to-peer client software has been installed on said target computer based on the TCP/IP port number matching the known value.

3. The system as set forth in claim 1 wherein said files or directories are available over a private network and said scanning program is executed on a computer system separate from said target computer.

4. The system as set forth in claim 1 wherein said multimedia files are music based.

5. The system as set forth in claim 1 wherein said multimedia files are movie based.

6. The system as set forth in claim 1 wherein said multimedia files are ebook based.

7. The system as set forth in claim 1 wherein said first feature is a registry key indicative of installation of the peer-to-peer software.

8. The system as set forth in claim 1 wherein said first feature is a file directory.

9. The system as set forth in claim 1 wherein said first feature is a running process that corresponds to installation of the peer-to-peer client software.

10. The system as set forth in claim 1 wherein said first feature is a code known to be included in peer-to-peer protocol messages exchanged between said target computer and other computers connected to a peer-to-peer network.

11. The system as set forth in claim 1 wherein determining if the multimedia files are stored locally on said target computer further comprises searching all folder and directories on the entirety of the local storage of the target computer for the multimedia files.

12. A method comprising:
   reviewing, by a processor of a computer, a first feature of a target computer indicative of installation of peer-to-peer client software on the target computer, wherein said first feature is selected from a group consisting of said target computer's registry keys, registry values, installed executable files, disk directories and network communications;
   comparing said first feature of said target computer to first known information indicative of installation of the peer-to-peer client software on the target computer;
   reviewing a second feature of said target computer indicative of past participation in peer-to-peer network communication by the peer-to-peer client software on said target computer, said second feature consisting of determining if multimedia files are stored locally on an entirety of local storage of said target computer;
   comparing said second feature of said target computer to second known information including at least a predetermined threshold count of multimedia files wherein a search is initiated on the entirety of local storage of said target computer for the multimedia files and the search is stopped when the predetermined threshold count of multimedia files is reached, the predetermined threshold count of multimedia files being indicative of the past participation by the peer-to-peer client software in the peer-to-peer network communication;
   determining that the peer-to-peer client software has been installed on said target computer and that files are being shared by the target computer in the peer-to-peer network communication in response to the compare of said first feature matching the first known information indicative of installation of the peer-to-peer client software on the target computer and the compare of said second feature being greater than or equal to the second known information including the at least the predetermined threshold count of multimedia files;
   in response to the determination that the peer-to-peer client software has been installed on said target computer and that files are being shared by the target computer in the peer-to-peer network communication, disabling the peer-to-peer client software and notify a network administrator of result of the comparisons; and
   determining that the peer-to-peer client software has not been installed on said target computer and that files are not being shared by the target computer in the peer-to-peer network communication in response to the compare of said first feature not matching the first known information indicative of installation of the peer-to-peer client software on the target computer and the compare of said second feature being less than the second known information including the at least the predetermined threshold count of multimedia files.

13. The method as set forth in claim 12 wherein said multimedia files are music based.

14. The method as set forth in claim 12 wherein said multimedia files are movie based.

15. The method as set forth in claim 12 wherein said multimedia files are ebook based.

16. The method as set forth in claim 12 further comprising:
   connecting to a TCP/IP port of the target computer;
   comparing a TCP/IP port number of the TCP/IP port to a known value; and
   determining that the peer-to-peer client software has been installed on the target computer in response to the TCP/IP port number matching the known value.

17. The method as set forth in claim 12 wherein said first feature is a registry key indicative of installation of the peer-to-peer client software.

18. The method as set forth in claim 12 wherein said first feature is a file directory.

19. The method as set forth in claim 12 wherein said first feature is a running process that corresponds to installation of the peer-to-peer client software.

20. A non-transitory computer-readable storage medium containing executable program instructions executed by a processor, comprising:
   program instructions that receive a first feature of a target computer indicative of installation of peer-to-peer client software on the target computer, wherein said first feature is selected from a group consisting of said target computer's registry keys, registry values, installed executable files, disk directories and network communications;
   program instructions that compare said first feature of said target computer to first known information indicative of installation of the peer-to-peer client software on the target computer;
   program instructions that review a second feature of said target computer indicative of past participation in peer-to-peer network communication by the peer-to-peer client software on said target computer, said second feature consisting of determining if multimedia files are stored locally on an entirety of local storage of said target computer;
   program instructions that compare said second feature of said target computer to second known information including at least a predetermined threshold count of multimedia files wherein a search is initiated on the entirety of local storage of said target computer for the multimedia files and the search is stopped when the predetermined threshold count of multimedia files is reached, the predetermined threshold count of multimedia files being indicative of the past participation by the peer-to-peer client software in the peer-to-peer network communication;

program instructions that determine that the peer-to-peer client software has been installed on said target computer and that files are being shared by the target computer in peer-to-peer network communication in response to the compare of said first feature matching the first known information indicative of installation of the peer-to-peer client software on the target computer and the compare of said second feature being greater than or equal to the second known information including the at least the predetermined threshold count of multimedia files;

program instructions that disable the peer-to-peer network client software and notify a network administrator of result of the comparisons, in response to the determination that the peer-to-peer client software has been installed on said target computer and that files are being shared by the target computer in the peer-to-peer network communication; and program instructions that determine that the peer-to-peer client software has not been installed on said target computer and that files are not being shared by the target computer in the peer-to-peer network communication in response to the compare of said first feature not matching the first known information indicative of installation of the peer-to-peer client software on the target computer and the compare of said second feature being less than the second known information including the at least the predetermined threshold count of multimedia files.

\* \* \* \* \*